(12) United States Patent
Müeller et al.

(10) Patent No.: US 6,574,928 B2
(45) Date of Patent: Jun. 10, 2003

(54) EXTERNAL UTILITIES MANAGER FOR POST AND BEAM FURNITURE SYSTEMS

(75) Inventors: Karl Heinz Müeller, East Grand Rapids, MI (US); James N. Ludwig, East Grand Rapids, MI (US)

(73) Assignee: Steelcase Development Corporation, Caledonia, MI (US)

( * ) Notice: Subject to any disclaimer, the term of this patent is extended or adjusted under 35 U.S.C. 154(b) by 0 days.

(21) Appl. No.: 09/800,007

(22) Filed: Mar. 6, 2001

(65) Prior Publication Data

US 2002/0124511 A1 Sep. 12, 2002

(51) Int. Cl.[7] ................................................ E04B 1/00
(52) U.S. Cl. ........................ 52/220.7; 52/239; 52/238.1; 52/220.1; 52/243; 52/40
(58) Field of Search .............................. 52/220.7, 239, 52/238.1, 220.1, 243, 40

(56) References Cited

U.S. PATENT DOCUMENTS

| | | |
|---|---|---|
| 3,759,297 A | 9/1973 | Anderson et al. |
| 5,195,286 A | 3/1993 | DeLong et al. |
| 5,277,007 A | 1/1994 | Hellwig et al. |
| 5,362,923 A | 11/1994 | Newhouse et al. |
| 5,394,658 A | 3/1995 | Schreiner et al. |
| 5,675,949 A | 10/1997 | Forslund et al. |
| 5,687,513 A | 11/1997 | Baloga et al. |
| 5,768,840 A | 6/1998 | Feldpausch |
| 5,831,211 A | 11/1998 | Gartung et al. |
| 5,881,500 A | 3/1999 | Latino et al. |
| 5,899,025 A | 5/1999 | Casey et al. |
| 5,950,371 A | 9/1999 | Rives et al. |
| 6,003,275 A | 12/1999 | Cornell et al. |
| 6,037,538 A | 3/2000 | Brooks |
| 6,067,762 A | 5/2000 | Greer et al. |
| 6,073,399 A | 6/2000 | Shipman et al. |

FOREIGN PATENT DOCUMENTS

WO          23793         10/1999

OTHER PUBLICATIONS

"Good Stuff" By Herman Miller, Inc., Zeeland, Michigan (22 pp.) Dated 2000.
"Good Stuff" By Herman Miller, Inc., Zeeland, Michigan (22 pp.) Dated 2000

Primary Examiner—Carl D. Friedman
Assistant Examiner—Nahid Amiri
(74) Attorney, Agent, or Firm—Price, Heneveld, Cooper, DeWitt & Litton

(57) ABSTRACT

An external utilities manager is designed for post and beam furniture systems of the type having overhead beams supported on vertical posts. The posts include outwardly protruding flanges which extend along the length of the posts. The external utilities manager includes a vertical raceway having a hollow interior configured to route utilities therealong, and an enclosed exterior disposed between the flanges of an associated post, and extending therealong to an open upper end. A horizontal raceway is positioned adjacent to and extends along the side face of an associated beam, and includes an interior configured to route utilities therealong. One end of the horizontal raceway is positioned adjacent to and communicates with the upper end of the vertical raceway to route utilities throughout the furniture system.

78 Claims, 9 Drawing Sheets

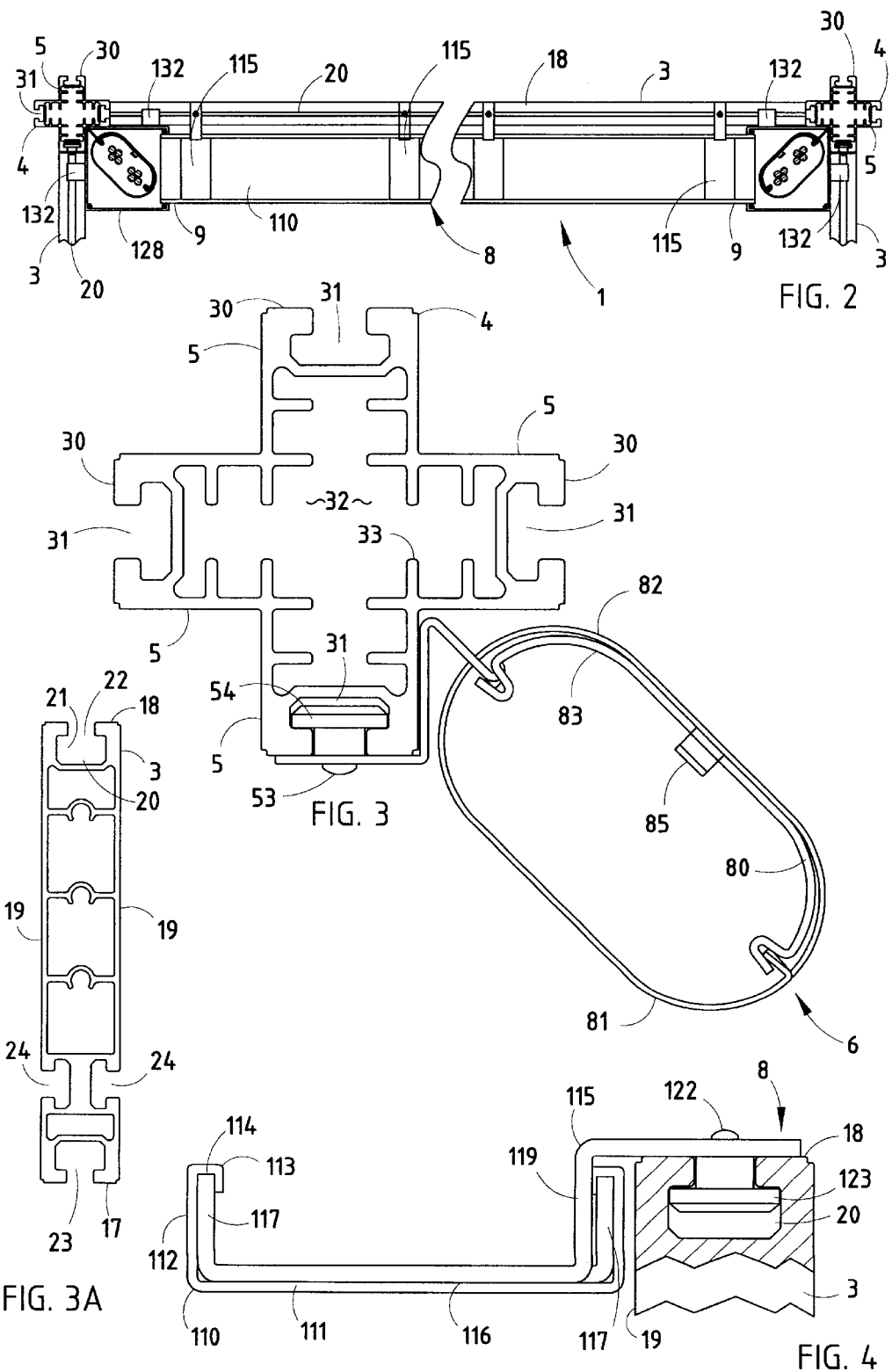

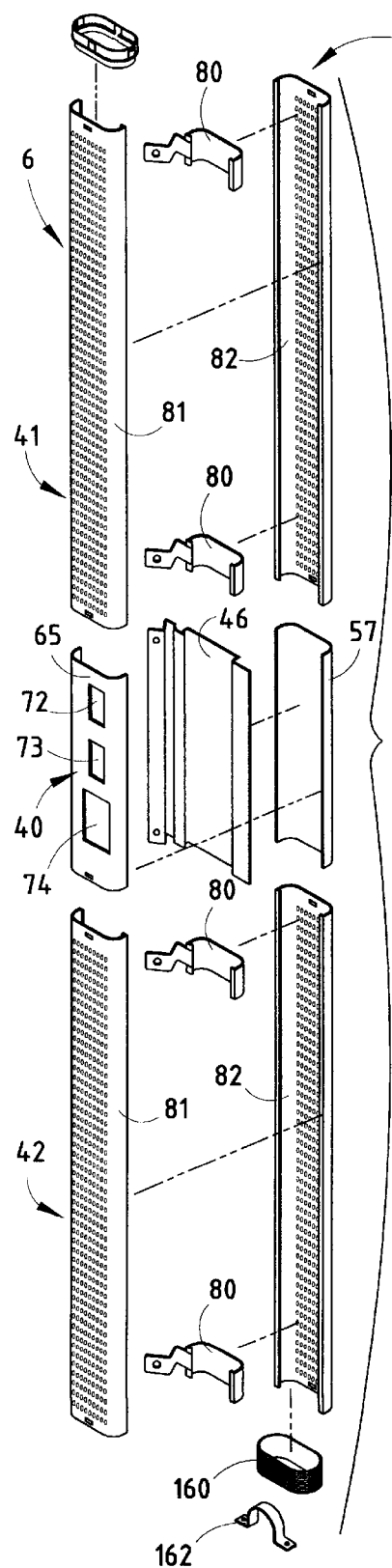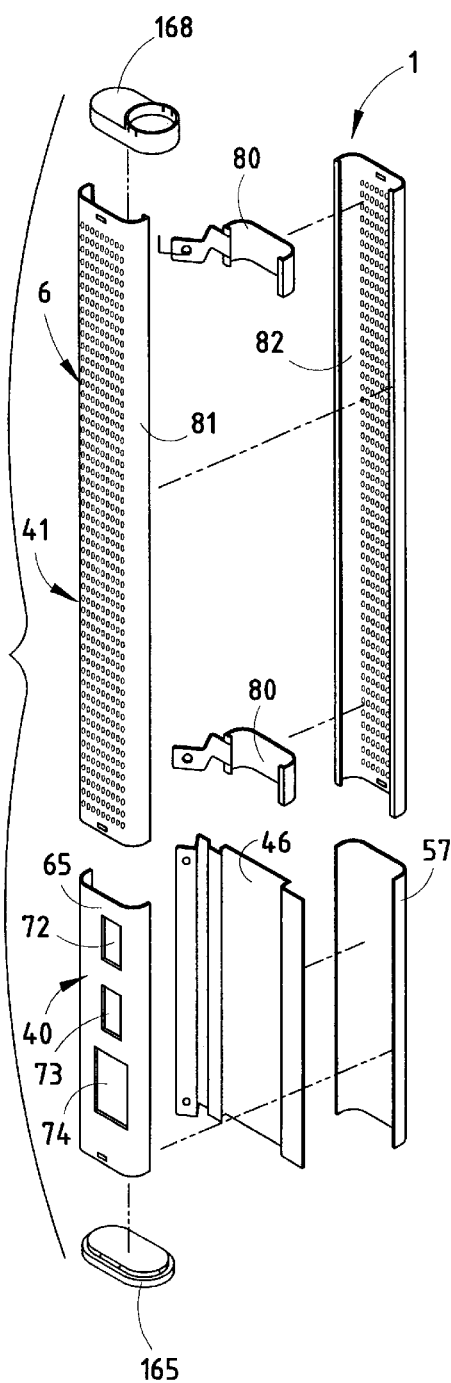

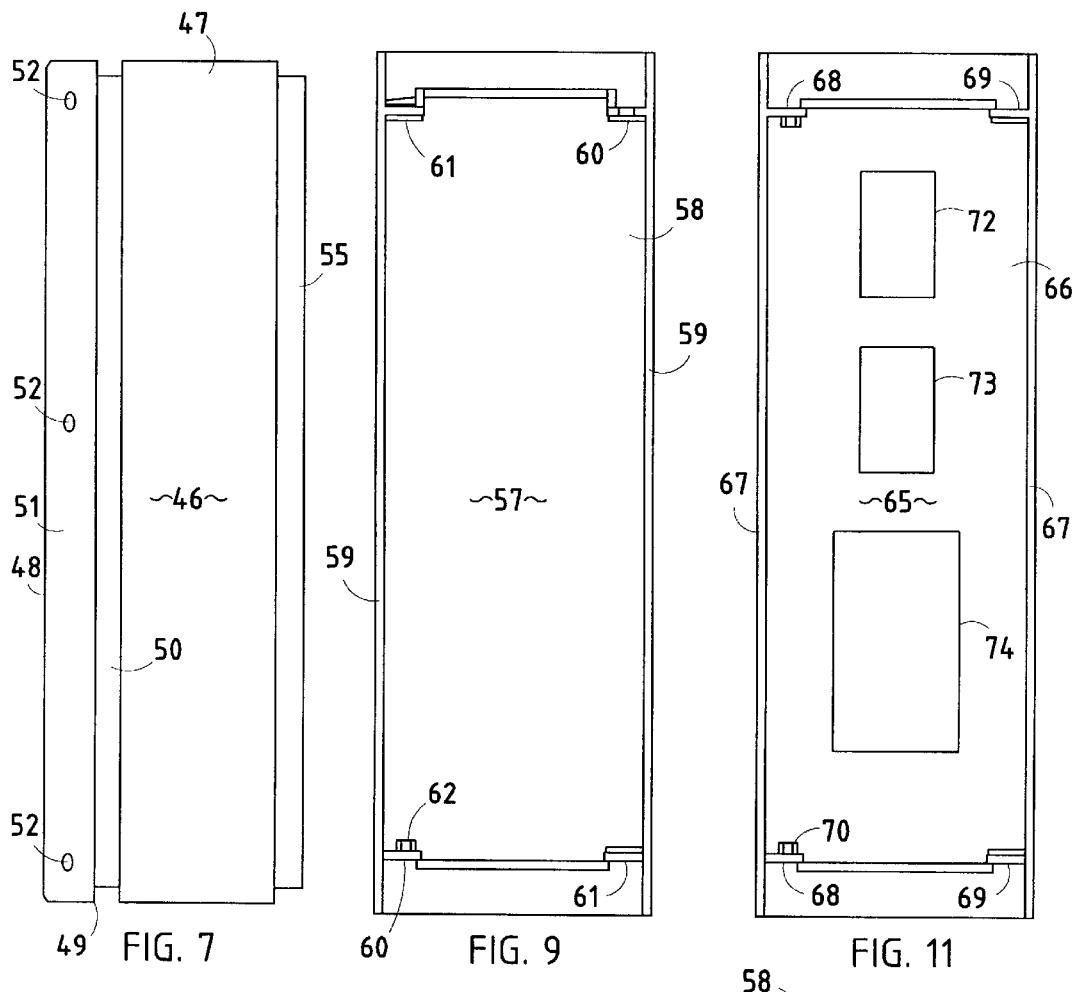

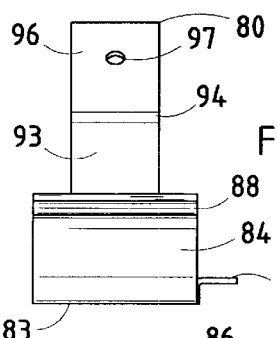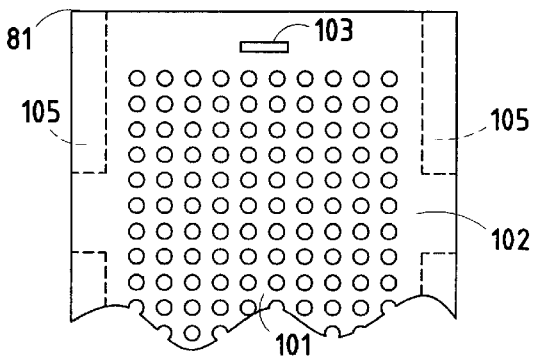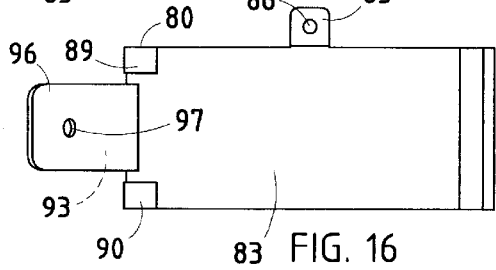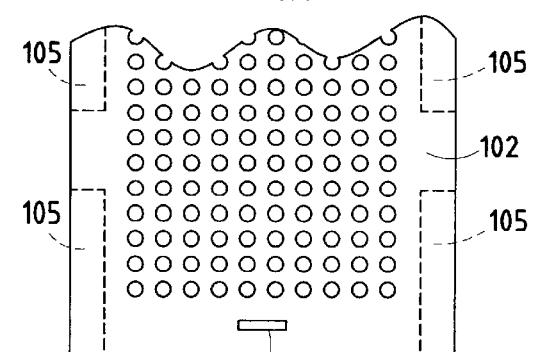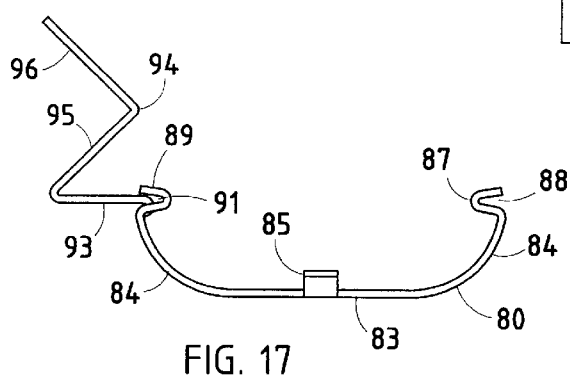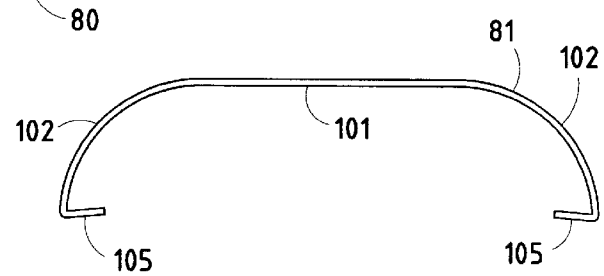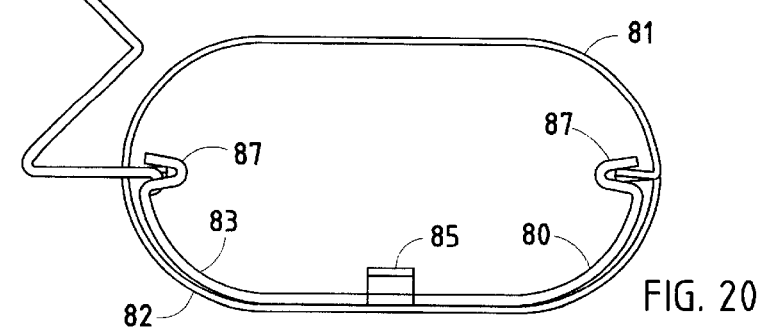

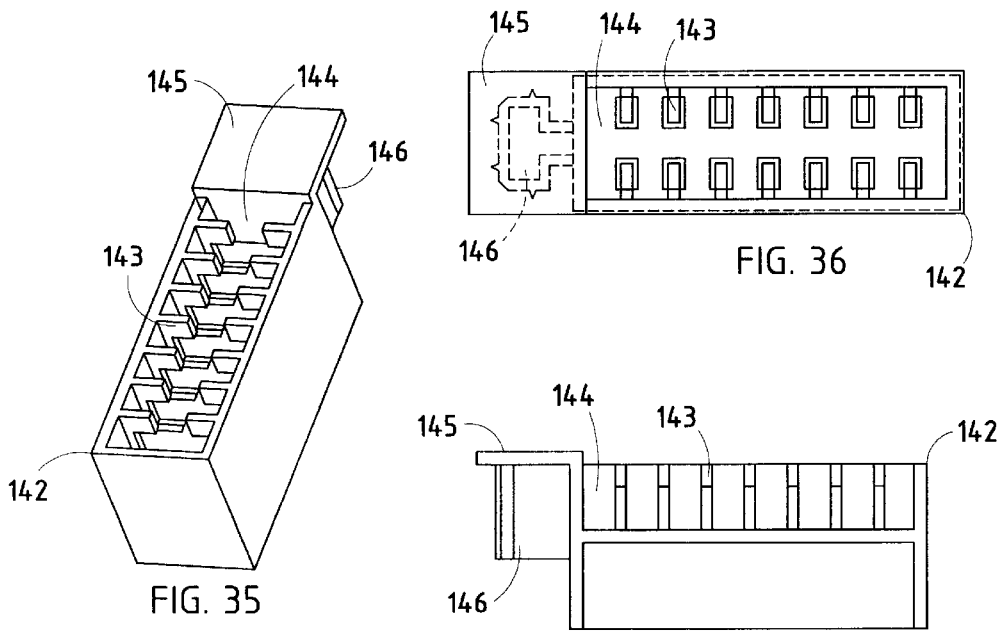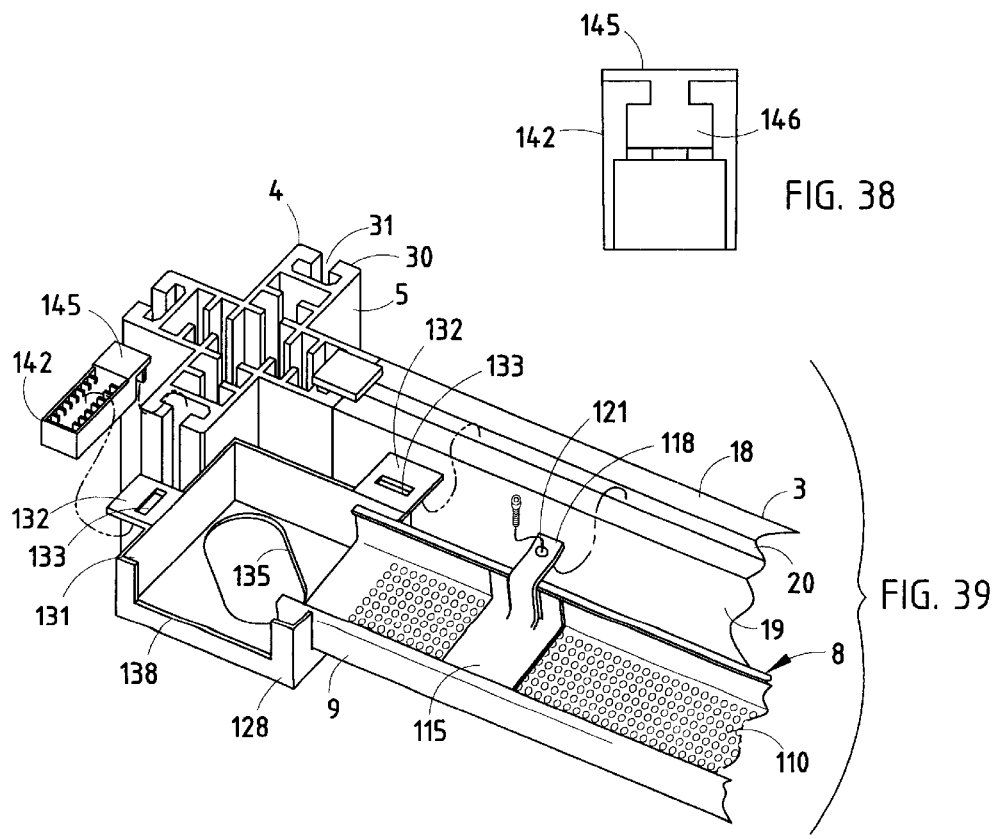

EXTERNAL UTILITIES MANAGER FOR POST AND BEAM FURNITURE SYSTEMS

CROSS REFERENCE TO RELATED APPLICATIONS

The present application is related to commonly assigned, copending U.S. patent application Ser. No. 09/800,006, filed Mar. 6, 2001, entitled POST AND BEAM FURNITURE SYSTEM, as well as U.S. patent application Ser. No. 09/800,005, filed Mar. 6, 2001, entitled IN-FILL PANEL ARRANGEMENT FOR POST AND BEAM FURNITURE SYSTEMS, which are hereby incorporated herein by reference.

BACKGROUND OF THE INVENTION

The present invention relates to furnishings for open office spaces and the like, an in particular to an external utilities manager for post and beam furniture systems.

Portable partition systems for open office spaces and other similar settings are well known in the art. Individual partition panels are interconnected in different configurations to form separate offices, workstations and/or work settings. The partition panels are extremely durable and can be readily disassembled and reassembled into alternative configurations to meet the ever-changing needs of the user. Examples of such partition systems are provided in U.S. Pat. Nos. 3,822,146; 3,831,330; and 4,144,924, which are owned by Steelcase Development Inc., the assignee of the present application.

Post and beam furniture systems have also been developed to divide open plans three dimensionally into individual workstations and/or work settings. Examples of such furniture systems are provided in U.S. Pat. Nos. 6,003,275; 5,950,371; and 5,889,025, which are also owned by Steelcase Development Inc., the assignee of present application.

Changing technology and changing work processes demand that current office furnishings be readily adaptable to efficiently support the ever-changing needs of workers, such that the reconfigurability of the system, and the efficient routing of utilities to the various workstations are desired to meet these needs.

SUMMARY OF THE INVENTION

One aspect of the present invention is a post and beam furniture system for partitioning open office spaces and the like, comprising at least one overhead beam disposed in a normally horizontal orientation, and having at least one side face thereof disposed in a normally vertical orientation. The furniture system also includes at least one vertical post having a lower portion thereof adapted to be supported on an associated floor surface, and an upper portion thereof connected with the beam to retain the beam at a predetermined elevation above the floor surface. The post includes at least two outwardly protruding flanges which extend along the length of the post. The furniture system also incorporates an external utilities manager including at least one vertical raceway having a hollow interior configured to route utilities therealong, and an enclosed exterior disposed generally between the flanges of an associated one of the posts, and extending therealong to an open upper end. At least one horizontal raceway is positioned adjacent to and extends along the side face of the beam, and includes an interior configured to route utilities therealong, and at least one end positioned adjacent to and communicating with the upper end of the vertical raceway to route utilities throughout the furniture system.

Another aspect of the present invention is an external utilities manager for post and beam furniture systems of the type having at least one overhead beam disposed in a normally horizontal orientation with at least one side face thereof disposed in a normally vertical orientation, and at least one vertical post having a lower portion thereof adapted to be supported on an associated floor surface, an upper portion thereof connected with the beam to retain the beam at a predetermined elevation above the floor surface, and at least two outwardly protruding flanges which extend along the length of the post. The external utilities manager comprises at least one vertical raceway having a hollow interior configured to route utilities therealong, and an enclosed exterior shaped to be positioned generally between the flanges of the posts, and extending therealong to an open end thereof. At least one horizontal raceway is positioned adjacent to and extends closely along the side face of the beam, and includes an interior configured to route utilities therealong, and at least one end positioned adjacent to and communicating with the upper end of the vertical raceway to route utilities throughout the furniture system.

The principle objects of the present invention are to provide a utilities manager that routes utilities external of a post and beam furniture system to effectively and efficiently provide utilities to individual workstations without detracting from the aesthetics of the furniture system. Vertical raceways extend generally between outwardly protruding flanges on the posts, and horizontal raceways extend along the side faces of the beams to provide a completely integrated design theme. The vertical and horizontal raceways may have a see-through appearance to create a unique look and feel that complements the design of the furniture system. The furniture system and related external utilities manager are efficient in use, economical to manufacture, capable of a long operating life and particularly well adapted for the proposed use.

These and other advantages of the invention will be further understood and appreciated by those skilled in the art by reference to the following written specification, claims and appended drawings.

BRIEF DESCRIPTION OF THE DRAWINGS

FIG. 2 is a fragmentary top plan view of the external utilities manager shown attached to the furniture system.

FIG. 3 is a top plan view of a vertical raceway portion of the external utilities manager, shown attached to a furniture post.

FIG. 3A is an end elevational view of a furniture beam.

FIG. 4 is a fragmentary vertical cross-sectional view of a furniture beam with a horizontal raceway portion of the external utilities manager shown attached to the beam.

FIG. 5 is an exploded perspective view of a first embodiment of the horizontal raceway which is configured to extend between the floor surface and the horizontal raceway.

FIG. 6 is an exploded perspective view of another embodiment of the vertical raceway which is configured to extend between worksurface level and the horizontal raceway.

FIG. 7 is a front elevational view of a port mounting plate.

FIG. 8 is a top plan view of the port mounting plate.

FIG. 9 is a front elevational view of a rear cover member.

FIG. 10 is a top plan view of the rear cover member.

FIG. 11 is a rear elevational view of a front cover member.

FIG. 12 is a top plan view of the front cover member.

FIG. 13 is a top plan view of the assembled mounting plate and cover members shown attached to an associated furniture post.

FIG. 15 is a front elevational view of a tube bracket.

FIG. 16 is a rear elevational view of the tube bracket.

FIG. 17 is a top plan view of the tube bracket.

FIG. 18 is a front elevational view of a cover half.

FIG. 19 is a top view of the cover half.

FIG. 20 is a top plan view of the tube bracket with front and rear cover halves attached thereto.

FIG. 35 is a perspective view of a beam support.

FIG. 36 is a top plan view of the beam support.

FIG. 37 is a vertical cross-sectional view of the beam support.

FIG. 38 is an end elevational view of the beam support.

FIG. 39 is an exploded perspective view of the beam support attached to a post to mount a power corner thereon.

DETAILED DESCRIPTION OF THE PREFERRED EMBODIMENTS

Figure 1:
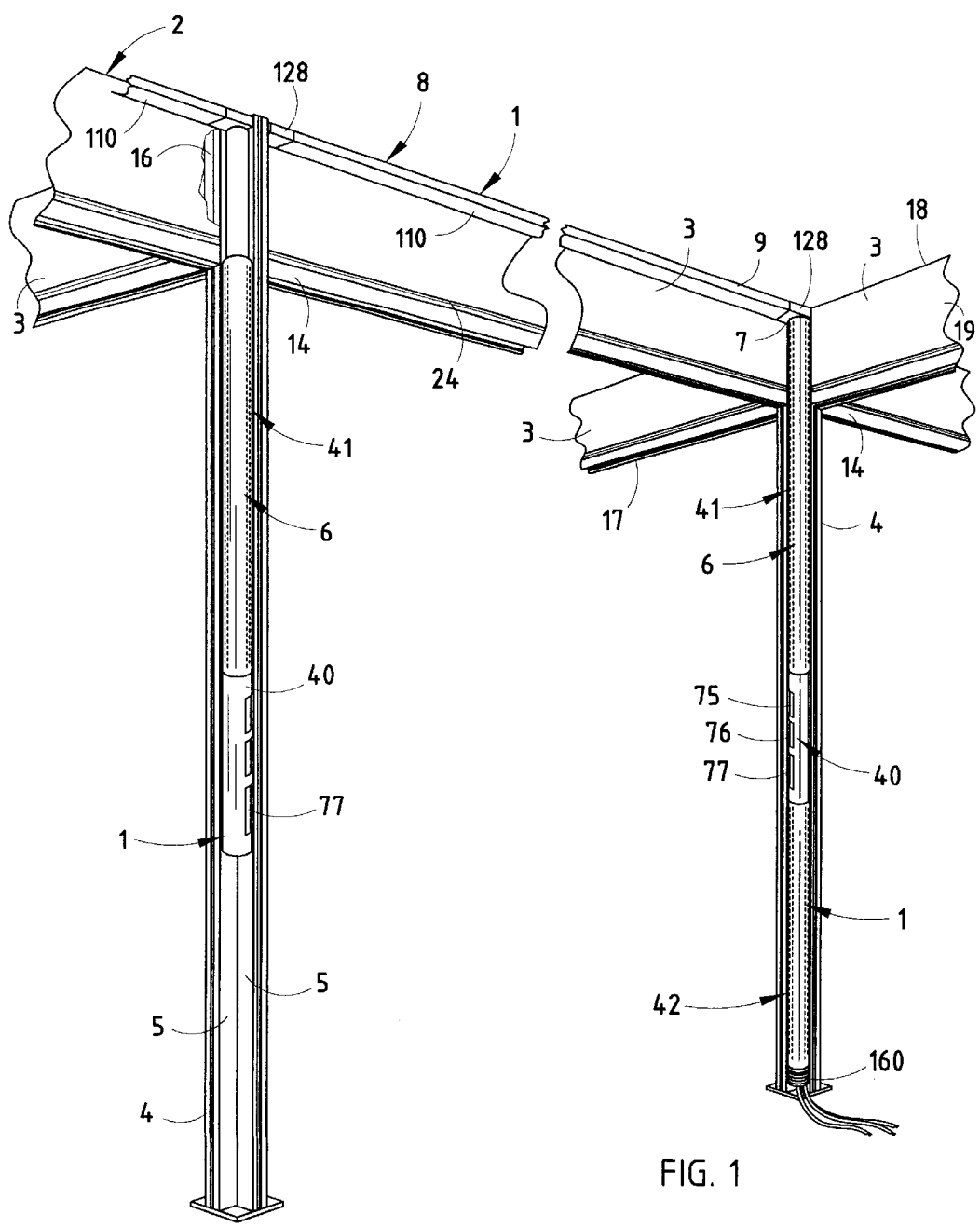
FIG. 1 is a perspective view of an external utilities manager and associated post and beam furniture system embodying the present invention.

For purposes of description herein the terms "upper", "lower", "right" "left", "rear", "front", "vertical", "horizontal" and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be construed as limiting, unless the claims expressly state otherwise.

The reference numeral 1 (FIG. 1) generally designates an external utilities manager embodying the present invention, which is designed for furniture systems, such as the illustrated post and beam furniture system 2 of the type having overhead beams 3 supported on vertical posts 4. The posts 4 include outwardly protruding flanges 5 which extend along the length of the posts 4. External utilities manager 1 includes vertical raceways 6, each of which has a hollow interior configured to route utilities therealong, and an enclosed exterior disposed generally between the flanges 5 of an associated one of the posts 4, and extending along at least a portion thereof to an open upper end 7. External utilities manager 1 also includes horizontal raceways 8 which are positioned adjacent to and extend along the side face of an associated beam 3, and include an interior configured to route utilities therealong. The ends 9 of horizontal raceways 8 are shaped to be positioned adjacent to and communicate with the open upper ends 7 of vertical raceways 6 to route utilities throughout the furniture system 2.

The illustrated beams 3 (FIGS. 1, 2 and 4) are substantially identical to those disclosed in related application Ser. No. 09/800,006, filed Mar. 6, 2001, entitled POST AND BEAM FURNITURE SYSTEM, which is incorporated herein by reference, and includes opposite ends 14 to which post-to-beam connectors 16 are attached. As best shown in FIG. 3A, beams 3 have a generally rectangular vertical cross-sectional shape defining a lower face 17, an upper face 18 and opposite side faces 19. A single slot 20 extends along the uppermost face 18 of beam 3 and has a generally T-shaped lateral cross-sectional configuration with an enlarged interior track portion 21 and reduced neck portion 22 which opens outwardly and upwardly. The lowermost face 17 of beam 3 also has a single horizontal slot 23 extending centrally therealong with a generally T-shaped lateral cross-sectional configuration that is substantially identical in size and shape to that of slot 20. The opposite side faces 19 of beam 3 include hanger slots 24 which extend horizontally therealong a predetermined distance above the lowermost face 17, and are adapted to support accessories therefrom, such as white board, privacy panels, etc. Slots 24 have a generally T-shaped lateral cross-sectional configuration that is similar in shape and size to that of slot 20, except that they are not as deep.

As shown in FIGS. 2 and 3, in the illustrated example, posts 4 have an X-shaped top plan configuration with four flanges 5 which extend outwardly in a mutually perpendicular relationship, each of which has a flat end face 30 with a single vertical slot 31 extending therealong. The post slot 31 has a generally T-shaped lateral cross-sectional configuration that is identical in shape and size to the previously described hanger slots 24 in beams 3. The illustrated X-shaped post 4 has a hollow interior 32 with inwardly projecting reinforcing ribs 33. It is to be understood that post and beam furniture system 2 also contemplates the use of Y-shaped posts (not shown), which are substantially identical to the X-shaped posts, except that they have only three flanges which are spaced 120 degrees apart.

Figure 14:
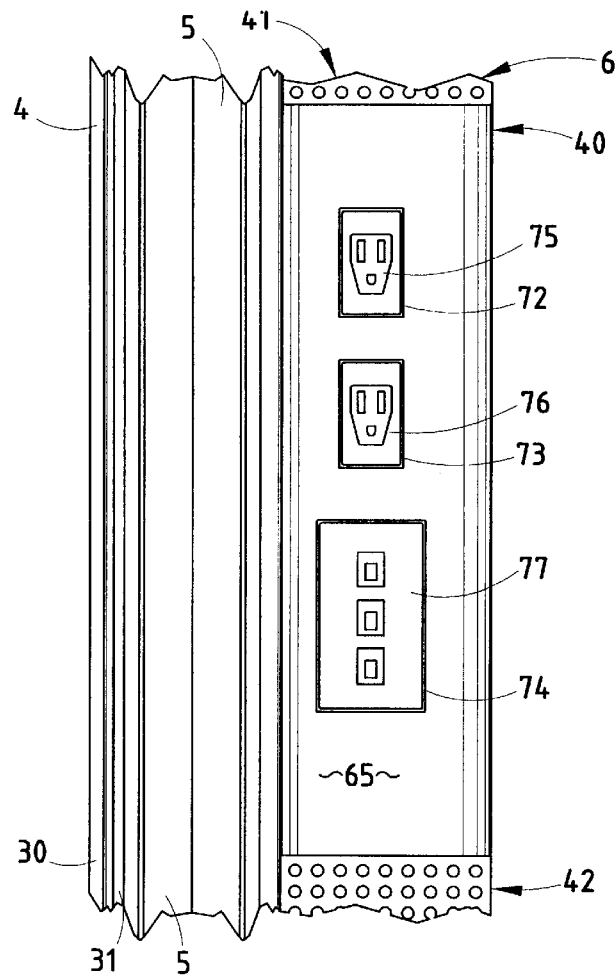
FIG. 14 is a fragmentary front elevational view of the assembly shown in FIG. 13.

The vertical raceway 6 illustrated in FIG. 5 includes a port mounting assembly 40 and upper and lower power/data tube assemblies 41 and 42 respectively, which are interconnected in an end-to-end relationship to form a vertical raceway which extends from the floor surface to an associated horizontal raceway 8. In the example shown in FIGS. 7–13, port mounting assembly 40 includes a mounting plate 46 having a hat-shaped central web 47 adapted to attach utility outlets or receptacles thereto in the manner described in greater detail hereinafter. Mounting plate 46 includes an outwardly extending attachment flange 48 extending along one side edge of hat-shaped web 47. Attachment flange 48 includes an L-shaped outer flange 48 which defines mutually perpendicular arms 50 and 51. Outermost arm 51 is disposed at a 45 degree angle with respect to central web 47 so as to position mounting plate 46 generally between two adjacent post flanges 5 in the manner shown in FIG. 13. Arm 51 of mounting plate 46 includes three fastener apertures 52 extending laterally therethrough to receive T-fasteners 53 which attach mounting plate 46 to an associated post 4, and include T-nuts 54 received in the slot 31 on the end face 5 of the post flange 5. The opposite side of mounting plate 46 includes an L-shaped flange 55. Port mounting assembly 40 also includes a rear cover member 57 (FIGS. 9 and 10) which has a semi-oval top plan configuration, and includes a solid outer wall 58 that terminates in opposite side edges 59. Each rear cover member 57 includes two sets of inwardly extending attachment tabs 60 and 61 positioned adjacent the upper and lower ends thereof. One of the attachments 60 includes a vertically projecting pin 62, while the opposite connecting tab 61 includes an inwardly projecting snap 63 in the form of a split ring. Port mounting assembly 40 also includes a front cover member 65, which is similar to rear cover member 57, and includes an outer wall 66, side edges 67 and inwardly projecting mounting tabs 68 and 69. Mounting tabs 68 and 69 also include pins 70 and snaps 71 which mate with the snaps 71, pins 62 and rear cover member 57 to detachably interconnect the same about mount plates 46 in the manner shown in FIG. 13. The outer wall 66 of front cover member 65 includes a plurality of vertically aligned access windows 72–74 through which receptacles 75–77 extend in the fashion shown in FIGS. 13 and 14.

The upper and lower power/data assemblies 41 and 42 are substantially identical in construction, and each includes at least one tube bracket 80 (FIGS. 15–17) which attaches a pair of removable cover halves 81 and 82 to an associated post 4 in the manner described hereinbelow. Each of the illustrated tube brackets 80 has a semi-oval top plan configuration, and includes a generally flat central portion 83 with arcuate in turned side portions 84. The central portion 83 of tube bracket 80 includes an upstanding tab 85 with a fastener aperture 86 extending laterally therethrough. The right-hand side portion 84 of tube bracket 80 (as viewed in FIG. 17) includes an outwardly opening V-shaped flange 87 that defines an associated V-shaped notch 88 which extends along the side edge thereof. The left-hand side of tube bracket 80 (as viewed in FIG. 17) includes two similar V-shaped flanges 89 and 90 adjacent the top and bottom edges of tube bracket 80 which define similar notches 91, and an outwardly protruding attachment flange 93 which extends laterally between flanges 89 and 90, and is similar to the attachment flange 48 on mounting plate 46, and includes an L-shaped portion 94 with mutually perpendicular arms 95 and 96. A fastener aperture 97 extends laterally through the outer arm 96, and is shaped to receive a T-fastener 53 therethrough to attach tube bracket 80 to an associated post 4 in a manner substantially identical to the manner in which mounting plate 46 (FIG. 13) is attached to an associated post 4, as described above.

Cover halves 81 and 82 are substantially identical, and have a semi-oval plan configuration similar to that of tube bracket 80. In the illustrated example, cover halves 81 and 82 are constructed from a perforated sheet metal material, and include a central portion 101 and opposite arcuate side portions 102. The central portion 101 of each cover half 81, 82 includes upper and lower tab slots 103 and 104 (FIG. 18) which are shaped to closely receive the attachment tab 85 of tube bracket 80 therein. The side portions 102 of cover halves 81, 82 include three sets of inwardly protruding side flanges 105 which are shaped to be received within the notches 88 and 91 of tube bracket 80 to detachably interconnect cover halves 81 and 82 in the manner illustrated in FIG. 20.

The vertical raceway 6 shown in FIG. 5 may be attached to an associated post 4 in the following manner. Mounting plate 46 is first positioned at a convenient height for access, and is then attached to the associated post 4 by three T-fasteners 53 in the manner described hereinabove. Receptacles 75–77 are then attached to mounting plate 46 in a conventional manner. A pair of tube brackets 80 are then mounted to the post 4 both above and below port mounting assembly 40 to retain an associated pair of cover halves 81, 82. T-fasteners 53 are used to attach each tube bracket 80 to the end face of the associated post 4. Utilities, such as electrical power wires and/or communication/data cables, are then attached to the receptacles 75–77, and routed vertically downwardly to or through the floor for attachment to a utilities source and/or upwardly to an associated ceiling source. Cover halves 81, 82 are then attached to the associated tube brackets 80, and serve to enclose the wiring routed from or to port mounting assembly 40 and cover the same. When cover halves 81 and 82 are fully assembled, the vertical raceway has an oval plan configuration. Rear cover member 57 and front cover member 65 are then assembled over mounting plate 46 to enclose the receptacles 75–77.

FIGS. 30–34 illustrate a tube connector 150 which attaches to the top of upper power/data tube assembly 41 and the bottom of lower power/data tube assembly 42. Tube connector 150 has a sidewall 151 with an oval top plan shape similar to that of power/data tube assemblies 41, 42, and is preferably constructed in one piece from molded plastic, or the like. A ring 152 extends along the center of sidewall 151, and protrudes radially outwardly to define a collar. As viewed in FIGS. 30–34, the upper end 153 of tube connector 150 includes four locking tabs 154 with outwardly extending barbs 155 adjacent their free ends, which are shaped to be received in the slots 103, 104 at the ends of cover halves 81, 82 in the manner shown in FIG. 34. The lower end 156 of tube connector 150 is smooth and continuous, and is shaped to be received through the oval window 135 in a power corner 128.

Figure 28:
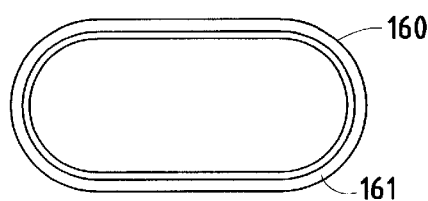
FIG. 28 is a top plan view of a flexible boot.
Figure 31:
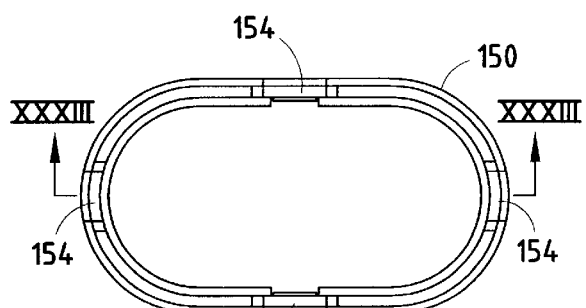
FIG. 31 is a top plan view of the tube connector.
Figure 29:
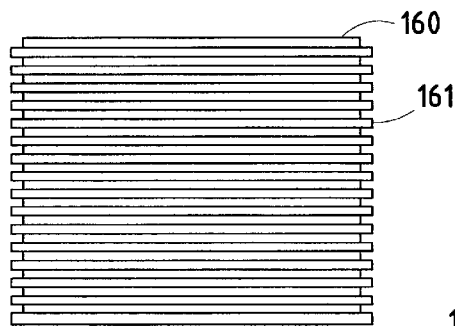
FIG. 29 is a front elevational view of the flexible boot.
Figure 32:
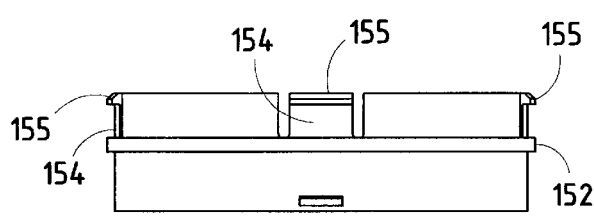
FIG. 32 is a front elevational view of the tube connector.
Figure 30:
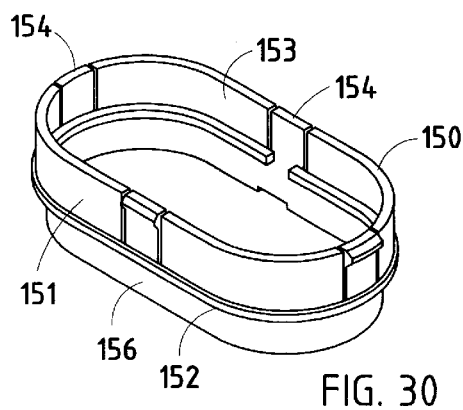
FIG. 30 is a perspective view of a tube connector.
Figure 33:
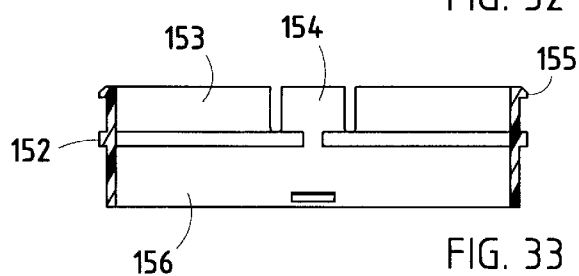
FIG. 33 is a vertical cross-sectional view of the tube connector taken along the line XXXIII—XXXIII, FIG. 31.
Figure 34:
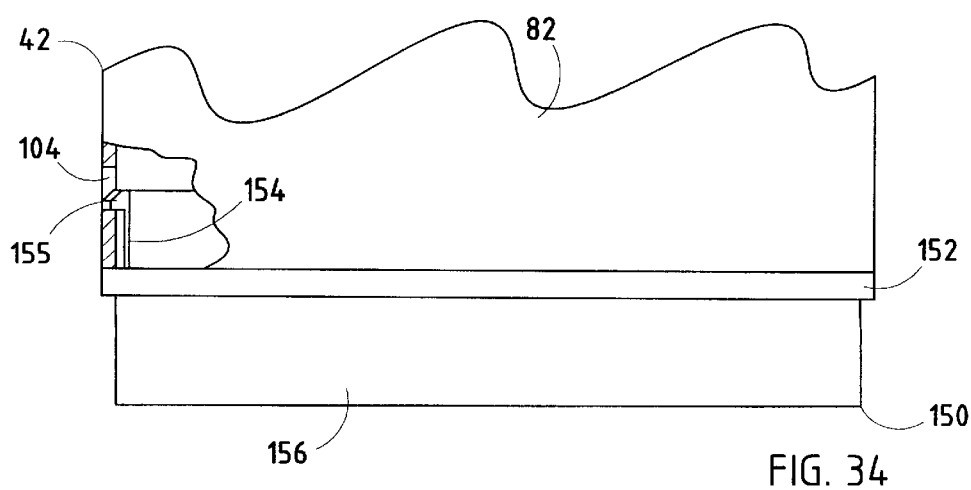
FIG. 34 is a side elevational view of the tube connector shown connected to an associated power/data tube, with a portion thereof broken away to reveal internal construction.

FIGS. 28 and 29 illustrate a flexible boot 160 which is designed to be attached to the free end of an associated power/data tube assembly 41, 42 when routing utilities into a vertical raceway 6, as shown in FIG. 1. Boot 160 has a flexible sidewall 161 with an oval top plan shape that telescopes over the end of one of the power/data tube assemblies 41, 42, and is corrugated to facilitate bending the same. Boot 160 may be constructed of molded plastic material or the like, and sidewall 161 is slit or cut to form an access aperture to route utilities therethrough. FIG. 5 illustrates a utilities anchor bracket 162 which holds the wires, etc. in place, and is disposed within the hollow interior of boot 160.

With reference to FIG. 6, an oval end cap 165 is provided to enclose an open end of a power/data tube assembly 41, 42. Also, a variety of pass-through caps, such as pass-through cap 168, may be provided to be attached to the end of a power/data tube assembly 41, 42, and permit the utilities to pass therethrough.

Figure 14A:
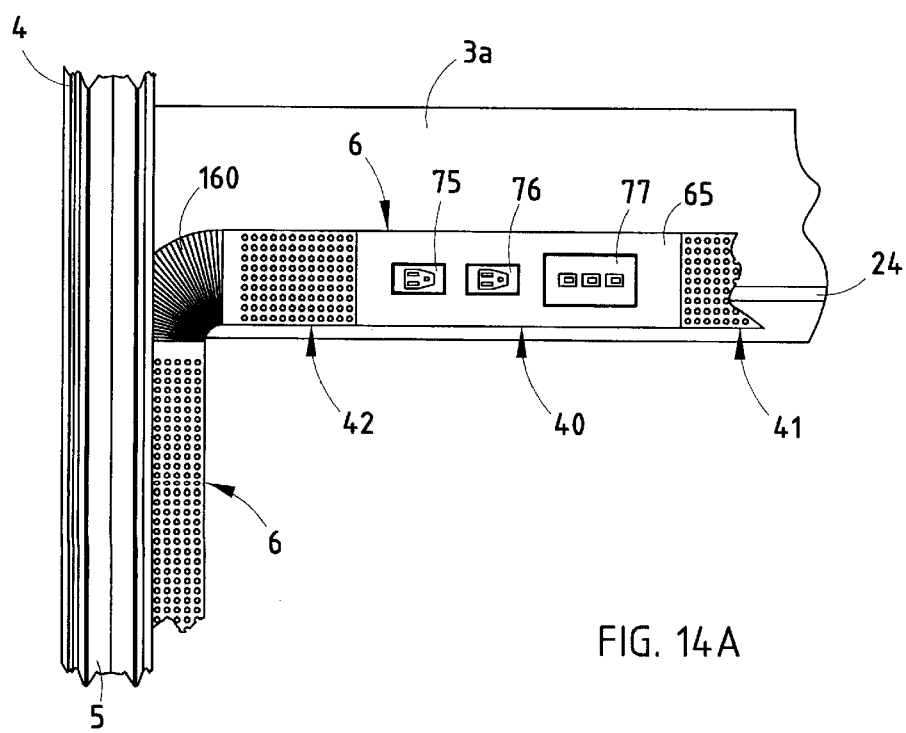
FIG. 14A is a fragmentary front elevational view of a fence raceway embodiment the present invention.

It is to be understood that power/data tube assemblies 41, 42 may be oriented in a wide variety of different directions and used in a variety of applications. For example, while the power/data tube assemblies 41 and 42 shown in FIG. 1 are oriented in a vertical direction, they may also be installed in a horizontal orientation, as shown in FIG. 14A. FIG. 14A shows a beam 3*a* that is mounted to associated post 4 adjacent worksurface height to define a fence type of beam 3*a*. Fence brackets (not shown) are provided to mount raceway 6 along the side face of fence beam 3 in a manner similar to the attachment of the same to a port 4, as described above. Raceway 6 may also be mounted along the bottom of fence beam 3 using slots 23, or along the top of fence beam 3 using slot 20. A flexible boot 160 is shown attached to the end of power/data tube assembly 42 to route utilities to an adjacent vertical raceway 6.

With reference to FIGS. 21–27A, the illustrated horizontal raceway 8 comprises a tray-shaped trough 110 with an open top for laying utilities into trough 110. Trough 110 (FIG. 27A) has a substantially U-shaped vertical cross-sectional configuration, comprising a flat lower web 111 having a pair of upstanding side flanges 112 at opposite sides thereof. Downwardly facing L-shaped top flanges 113 extend along the upper edges of side flanges 112, and define channels 114 which facilitate mounting trough 110 to an associated beam 3 in the manner described below. In the illustrated example, trough 110 is made from a perforated sheet metal similar to that of vertical raceway cover halves 81, 82, so as to provide a translucent or see-through appearance which mimics the see-through appearance of the vertical raceways 6.

Figure 21:
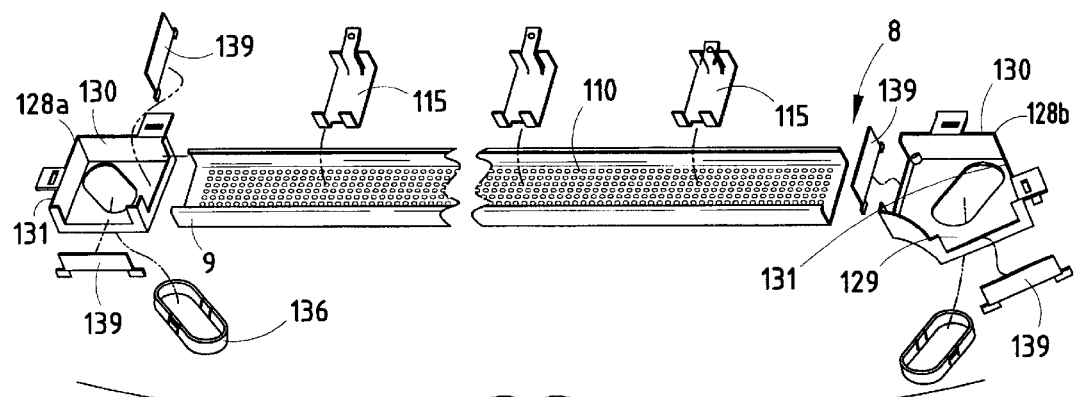
FIG. 21 is an exploded perspective view of the horizontal raceway.
Figure 22:
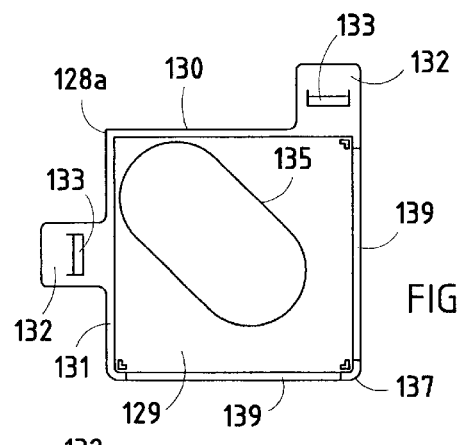
FIG. 22 is a top plan view of a power corner.
Figure 23:
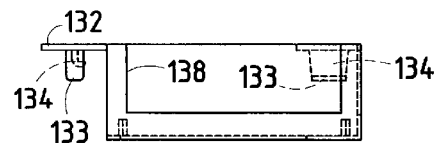
FIG. 23 is a side elevational view of the power corner.
Figure 24:
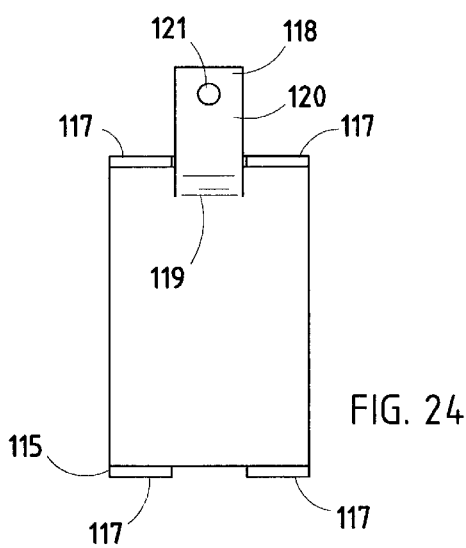
FIG. 24 is a top plan of a trough bracket.
Figure 26:
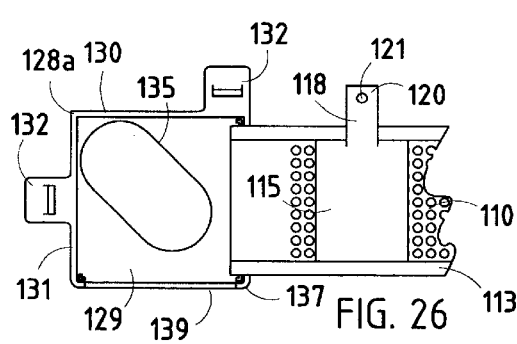
FIG. 26 is fragmentary top plan view of one end of the horizontal raceway with a trough bracket and a power corner.
Figure 25:
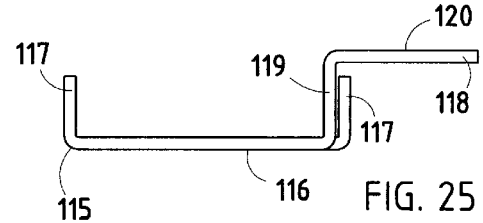
FIG. 25 is a side elevational view of the trough bracket.
Figure 27A:
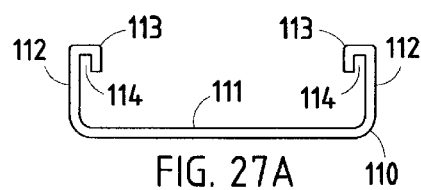
FIG. 27A is an end elevational view of a trough portion of the horizontal raceway.
Figure 27:
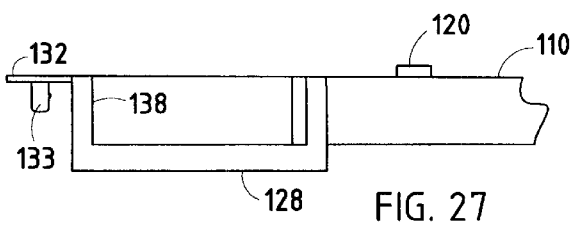
FIG. 27 is a fragmentary front elevational view of the assembly shown in FIG. 26.

Horizontal raceway 8 also includes a plurality of trough brackets 115 which mount trough 110 to an associated beam 3 in the manner discussed below. With reference to FIGS. 21, 25 and 26, trough brackets 115 have a generally U-shaped end elevational configuration, comprising a flat lower web 116 with two pairs of upstanding side flanges 117 at opposite sides thereof. An attachment arm 118, having a generally L-shaped configuration defining a vertical arm 119 and a horizontal arm 120, extends from the web 116 of trough bracket 115 upwardly and outwardly in between the adjacent pair of side flanges 117. A fastener aperture 121 extends vertically through horizontal arm 120 adjacent the free end thereof. Trough brackets 115 are preferably resilient, and may be constructed from a spring steel or the like. As best illustrated in FIG. 4, trough brackets 115 are shaped to be closely received within the interior of trough 110, with the web 116 of bracket 115 extending along and overlying the web 111 of trough 110, and the side flanges 117 of trough bracket 115 extending upwardly along the side flanges 112 of trough 110. Trough brackets 115 are sized so that side flanges 117 snap fit within trough 110 with the upper edges of side flanges 117 being captured in the downwardly opening channels 114 at the top flanges 113 of trough 110. Fasteners 122 are inserted through fastener apertures 121, and are mounted on beam 3 by T-nuts 123, which are in the illustrated example mounted in the slot 20 along the uppermost face 18 of beam 3. When assembled, trough brackets 115 position trough 110 to extend closely along the side face 19 of beam 3 adjacent the uppermost face 18 thereof.

Horizontal raceways 8 also include power corners 128 (FIGS. 21–27A), which are located at opposite ends of trough 110. Power corners 128 are substantially identical in construction, and are provided in at least two different angles to accommodate differently shaped posts 4. For example, in horizontal raceway 8 shown in FIG. 21, the left-hand power corner 128*a* accommodates 90 degree connections, and is designed for use in conjunction with an X-shaped post 4, whereas the right-hand power corner 128*b* interconnects troughs 110 in a 120 degree relationship, and is designed for use with Y-shaped posts 4. Power corners 128 are preferably constructed from a synthetic resin material and have a see-through or translucent appearance that mimics the see-through appearance of the perforated trough 110 and cover halves 81, 82. The 90 degree power corner 128*a* (FIGS. 22, 23 and 26) has a generally square plan configuration, and includes a base 129 with a pair of fixed sidewalls 130 and 131 extending along the rear and outer end sides of base 129. Mounting tabs 132 are attached to the upper edges of sidewalls 130 and 131, extend generally horizontally, and include depending hooks 133 with laterally extending barbs 134 that are inserted into and snap lock in the slots 20 along the uppermost faces 18 of adjacent beams 3, as shown in FIG. 2. Base 129 includes an oval window 135 therethrough oriented at a 45 degree angle with respect to the fixed sidewalls 130 and 131, and is shaped to receive therein an associated power/data tube assembly 41, 42. An oval cap 136 is provided to cover window 135 in the event there is no power/data tube assembly 41, 42 at the selected power corner 128. The front interior corner of base 129 includes an upstanding L-shaped post 137, which defines U-shaped openings 138 on adjacent sides of power corner 128*a* into which the ends of an associated trough 110 may be received. Removable sidewalls 139 are provided to enclose the U-shaped openings 138 in the event there is no trough 110 received in the same. In this manner, a single power corner 128 can be used at a variety of different locations by simply inserting removable sidewalls 139 where appropriate.

Sixty degree power corner 128*b* (FIG. 21) is substantially identical to 90 degree power corner 128*a*, except that base 129 is in the shape of a pentagon, wherein the sidewalls 130 and 131, as well as the open sides 138, are positioned 120 degrees apart, so as to interconnect two troughs 110 which come together at an 120 degree angle.

With reference to FIGS. 35–38, horizontal raceway 8 also includes beam supports 142, which in the illustrated example have a generally rectangular plan configuration with a series of slotted ribs 143 defining an interior channel 144. An integrally formed mounting arm 145 extends laterally from one end of beam support 142, and includes a downwardly extending key 146 which is shaped to be closely received in the slot 31 of an associated post 4. A beam support 142 is used at an end-of-run position, where two beams 3 do not come together at adjacent flanges 5 to support power corners 128. In such circumstances, a beam support is inserted into the open slot 31 at the top of post 4, and the hook 133 of power corner 128 is inserted into the channel 144 of beam support 142 to securely retain the power corner 128 in place, as shown in FIG. 39.

External utilities manager 1 is specifically designed for use in conjunction with post and beam furniture systems of the type disclosed in related U.S. patent application Ser. No. 09/800,006, filed Mar. 6, 2001, entitled POST AND BEAM FURNITURE SYSTEM, which is incorporated herein by reference, wherein the interiors of the beams 3 and posts 4 are relatively solid and/or not accessible, such that they are not particularly adapted to route utilities such as electrical power lines, communication/data cables, etc. therethrough. Hence, utilities manager 1 is designed to route utilities along the exterior of post and beam furniture system 2 to provide utilities to the various workstations, without detracting from the aesthetics of furniture system 2.

In operation, after the post and beam furniture system 2 has been fully assembled into the desired configuration, utilities are routed to the various workstations using external utilities manager 1. In the example illustrated in FIG. 1, utilities are brought into the post and beam furniture system 2 through the floor by routing wires through the boot 160 at the bottom of the right-hand full height vertical raceway 6. The wires are then routed upwardly through the lower power/data tube 42, attached to the port assembly 40, and then routed upwardly through the open end of the upper power/data tube 41 and horizontally into the trough 110 of the horizontal raceway 8. In the example illustrated in FIG. 1, the left-hand post 4 also includes a partial height vertical raceway 6 which extends from the trough 110 of horizontal raceway 8 down to a port assembly 40 located at worksurface level. Consequently, the utility wires in trough 110 are routed downwardly through the open end of the left-hand power/data tube 41 and attached to the receptacles 75–77 in the associated port assembly 40. In this manner, utilities are effectively and efficiently provided to each of the individual workstations by routing the same along the exterior of the furniture system 2, without detracting from the aesthetics of the furniture. The see-through appearance of the vertical and horizontal raceways 6 and 8 creates a unique look and feel to the furniture system 2.

In the foregoing description, it will be readily appreciated by those skilled in the art that modifications may be made to the invention without departing from the concepts disclosed herein. Such modifications are to be considered as included in the following claims, unless these claims by their language expressly state otherwise.

What is claimed is:

1. A post and beam furniture system for partitioning open office space, comprising:
   at least one overhead beam disposed in a normally horizontal orientation, and having at least one side face thereof disposed in a normally vertical orientation;
   at least one vertical post having a lower portion thereof adapted to be supported on an associated floor surface, and an upper portion thereof connected with said beam to retain said beam at a predetermined elevation above the floor surface; said post including at least two outwardly protruding flanges which extend along the length of said post;
   an external utilities manager, including: at least one vertical raceway having a hollow interior configured to route utilities therealong, and an enclosed exterior disposed generally between said flanges of said post; said vertical raceway having an oval plan configuration, and extending between said flanges along at least a portion of said post to an open upper end thereof; and
   at least one horizontal raceway positioned adjacent to and extending along said side face of said beam, and including a tray-shaped trough with an open top for laying utilities into said trough and routing the same therealong, and at least one end positioned adjacent to and communicating with said upper end of said vertical raceway to route utilities throughout said furniture system.

2. A furniture system as set forth in claim 1, wherein:
   said vertical raceway includes at least one removable cover to access the utilities.

3. A furniture system as set forth in claim 2, wherein:
   said vertical raceway includes a pair of mating removable cover halves.

4. A furniture system as set forth in claim 3, wherein:
   said cover halves are perforated to provide a see-through appearance.

5. A furniture system as set forth in claim 4, wherein:
   said vertical raceway includes a port member for mounting utility outlet receptacles therein.

6. A furniture system as set forth in claim 5, wherein:
   said vertical raceway includes at least one tube bracket mounted to said post, and configured to engage and support said cover halves thereon.

7. A furniture system as set forth in claim 6, wherein:
   said cover halves have a substantially identical U-shaped configuration, and attach to opposite sides of said tube bracket to define an oval power/data tube portion of said vertical raceway.

8. A furniture system as set forth in claim 7, wherein:
   said vertical raceway includes at least one tube connector extending around said cover halves to positively retain the same together.

9. A furniture system as set forth in claim 8, wherein:
   said port member includes:
   a mounting plate mounted to said post, and configured to attach utility receptacles thereto;
   a rear cover member attached to a rear portion of said mounting plate, and shaped to cover the same; and
   a front cover member attached to a front portion of said mounting plate, and shaped to cover the same and including windows therein shaped to receive the utility receptacles therethrough.

10. A furniture system as set forth in claim 9, wherein:
    said vertical raceway includes at least one flexible boot connected with a free end of said power/data tube.

11. A furniture system as set forth in claim 10, wherein:
    said vertical raceway includes at least one end cap detachably connected with and enclosing a free end of said power/data tube.

12. A furniture system as set forth in claim 11, wherein:
    said power/data tube defines an upper power/data tube having a lower end thereof disposed adjacent to said port member, and an upper end thereof defining said open upper end of said vertical raceway.

13. A furniture system as set forth in claim 12, wherein:
    said vertical raceway includes a lower power/data tube, configured similar to said upper power/data tube, and having an upper end thereof disposed adjacent to said port member, and a lower end thereof disposed adjacent to the floor surface, and having said tube connector mounted thereon, and said boot connected therewith.

14. A furniture system as set forth in claim 13, wherein:
    said tube connector defines a first tube connector; and including
    a second tube connector, configured similar to said first tube connector, and mounted on the upper end of said upper power/data tube.

15. A furniture system as set forth in claim 14, wherein:
    said horizontal raceway includes at least one trough bracket mounted to said beam, and configured to engage and support said trough thereon.

16. A furniture system as set forth in claim 15, wherein:
    said external wire manager includes at least one power corner positioned between said open upper end of said vertical raceway and said horizontal raceway, and configured to route wires therebetween.

17. A furniture system as set forth in claim 16, wherein:
    said power corner includes at least one removable sidewall to reconfigure said power corner for different positions on said trough.

18. A furniture system as set forth in claim 17, wherein:
said power corner includes a central aperture shaped to route wires therethrough when connected with said power/data tube, and a removable cap which encloses said central aperture when said power/data tube is not connected with said power corner.

19. A furniture system as set forth in claim 18, wherein:
said external utilities manager includes at least one beam support, configured to be attached to said beam and support a free end of said trough.

20. A furniture system as set forth in claim 19, wherein:
said post comprises an X-post having an X-shaped plan configuration with four of said flanges arranged in a mutually perpendicular relationship, and a substantially solid interior construction.

21. A furniture system as set forth in claim 20, wherein:
each of said flanges of said X-post has an end face with a single vertical slot extending therealong.

22. A furniture system as set forth in claim 21, including:
at least one beam-to-post connector attached to one end of said beam and detachably retained in said slot to attach said beam to said post.

23. A furniture system as set forth in claim 22, wherein:
said slot has a generally T-shaped cross-sectional configuration with an enlarged interior track portion and a reduced neck portion which opens outwardly.

24. A furniture system as set forth in claim 23, including:
at least one T-fastener removably mounted in said slot and attaching said tube bracket to said post.

25. A furniture system as set forth in claim 24, wherein:
said tube bracket is shaped to position said vertical raceway centrally between adjacent ones of said flanges on said post.

26. A furniture system as set forth in claim 25, including:
at least one T-fastener removably mounted in said slot and attaching said mounting plate to said post.

27. A furniture system as set forth in claim 26, wherein:
said beam includes a lowermost face with a horizontal T-slot extending therealong shaped similar to said slot in said post.

28. A furniture system as set forth in claim 27, including:
at least one T-fastener removably mounted in said T-slot of said beam and attaching said trough bracket to said beam.

29. A furniture system as set forth in claim 28, including:
a fence having one end thereof connected with said post, and extending generally horizontally therefrom adjacent a worksurface height; and
at least one fence raceway shaped similar to said vertical raceway, and connected with and extending horizontally along said fence.

30. A furniture system as set forth in claim 29, wherein:
said fence is shaped similar to said beam with T-slots extending along uppermost and lowermost faces thereof; and
said fence raceway includes fence brackets mounting said fence raceway in one of said T-slots on said fence.

31. A furniture system as set forth in claim 1, wherein:
said vertical raceway includes at least one removable cover to access the utilities.

32. A furniture system as set forth in claim 1, wherein:
said vertical raceway includes a pair of mating removable cover halves.

33. A furniture system as set forth in claim 1, wherein:
said vertical raceway is perforated to provide a see-through appearance.

34. A furniture system as set forth in claim 1, wherein:
said vertical raceway includes a port member for mounting utility outlet receptacles therein.

35. A furniture system as set forth in claim 1, wherein:
said vertical raceway includes at least one tube bracket mounted to said post.

36. A furniture system as set forth in claim 1, wherein:
said vertical raceway includes at least one tube connector.

37. A furniture system as set forth in claim 1, wherein:
said vertical raceway includes at least one flexible boot connected with a free end thereof.

38. A furniture system as set forth in claim 1, wherein:
said horizontal raceway includes at least one trough bracket mounted to said beam, and configured to engage and support said trough thereon.

39. A furniture system as set forth in claim 1, wherein:
said external wire manager includes at least one power corner positioned between said open upper end of said vertical raceway and said horizontal raceway, and is configured to route wires therebetween.

40. A furniture system as set forth in claim 39, wherein:
said power corner includes at least one removable slide to reconfigure said power corner for different positions on said trough.

41. A furniture system as set forth in claim 1, wherein:
said external utilities manager includes at least one beam support, configured to be attached to said beam and support a free end of said trough.

42. A furniture system as set forth in claim 1, wherein:
said post comprises an X-post having an X-shaped plan configuration with four of said flanges arranged in a mutually perpendicular relationship, and a substantially solid interior construction.

43. A furniture system as set forth in claim 42, wherein:
each of said flanges of said X-post has an end face with a single vertical slot extending therealong.

44. A furniture system as set forth in claim 43, including:
at least one beam-to-post connector attached to one end of said beam and detachably retained in said slot to attach said beam to said post.

45. A furniture system as set forth in claim 1, including:
a fence having one end thereof connected with said post, and extending generally horizontally therefrom adjacent a worksurface height; and
at least one fence raceway shaped similar to said vertical raceway, and connected with and extending horizontally along said fence.

46. A furniture system as set forth in claim 45, wherein:
said fence is shaped similar to said beam with slots extending along uppermost and lowermost faces thereof; and
said fence raceway includes fence brackets mounting said fence raceway in one of said slots on said fence.

47. An external utilities manager for post and beam furniture systems of the type having at least one overhead beam disposed in a normally horizontal orientation with at least one side face thereof disposed in a normally vertical orientation, and at least one vertical post having a lower portion thereof adapted to be supported on an associated floor surface, an upper portion thereof connected with the beam to retain the beam at a predetermined elevation above the floor surface, and at least two outwardly protruding flanges which extend along the length of said post; said external utilities manager comprising:

at least one vertical raceway having a hollow interior configured to route utilities therealong, and an enclosed exterior shaped to be positioned generally between the flanges of the post; said vertical raceway having an oval plan configuration, and extending between the flanges along at least a portion of the post to an open upper end thereof; and at least one horizontal raceway shaped for positioning adjacent to and for extending closely along the side face of the beam, and including a tray-shaped trough with an open top for laying utilities into said trough and routing the same therealong, and at least one end positioned adjacent to and communicating with said upper end of said vertical raceway to route utilities throughout said furniture system.

48. An external utilities manager as set forth in claim 47, wherein:

said vertical raceway includes at least one removable cover to access the utilities.

49. An external utilities manager as set forth in claim 48, wherein:

said vertical raceway includes a pair of mating removable cover halves.

50. An external utilities manager as set forth in claim 49, wherein:

said cover halves are perforated to provide a see-through appearance.

51. An external utilities manager as set forth in claim 50, wherein:

said vertical raceway includes a port member for mounting utility outlet receptacles therein.

52. An external utilities manager as set forth in claim 51, wherein:

said vertical raceway includes at least one tube bracket configured to be mounted to the post, and engaging and supporting said cover halves thereon.

53. An external utilities manager as set forth in claim 52, wherein:

said cover halves have a substantially identical U-shaped configuration, and attach to opposite sides of said tube bracket to define an oval power/data tube portion of said vertical raceway.

54. An external utilities manager as set forth in claim 53, wherein:

said vertical raceway includes at least one tube connector extending around said cover halves to positively retain the same together.

55. An external utilities manager as set forth in claim 54, wherein:

said port member includes:
a mounting plate adapted to be mounted to the post, and attaching utility receptacles thereto;
a rear cover member attached to a rear portion of said mounting plate, and shaped to cover the same; and
a front cover member attached to a front portion of said mounting plate, and shaped to cover the same and including windows therein shaped to receive the utility receptacles therethrough.

56. An external utilities manager as set forth in claim 55, wherein:

said vertical raceway includes at least one flexible boot connected with a free end of said power/data tube.

57. An external utilities manager as set forth in claim 56, wherein:

said vertical raceway includes at least one end cap detachably connected with and enclosing a free end of said power/data tube.

58. An external utilities manager as set forth in claim 57, wherein:

said power/data tube defines an upper power/data tube having a lower end thereof disposed adjacent to said port member, and an upper end thereof defining said open upper end of said vertical raceway.

59. An external utilities manager as set forth in claim 58, wherein:

said vertical raceway includes a lower power/data tube, configured similar to said upper power/data tube, and having an upper end thereof disposed adjacent to said port member, and a lower end thereof disposed adjacent to the floor surface, and having said tube connector mounted thereon, and said boot connected therewith.

60. An external utilities manager as set forth in claim 59, wherein:

said tube connector defines a first tube connector; and including
a second tube connector, configured similar to said first tube connector, and mounted on the upper end of said upper power/data tube.

61. An external utilities manager as set forth in claim 60, wherein:

said horizontal raceway includes at least one trough bracket mounted to said beam, and configured to engage and support said trough thereon.

62. An external utilities manager as set forth in claim 61, wherein:

said external wire manager includes at least one power corner positioned between said open upper end of said vertical raceway and said horizontal raceway, and is configured to route wires therebetween.

63. An external utilities manager as set forth in claim 62, wherein:

said power corner includes at least one removable slide to reconfigure said power corner for different positions on said trough.

64. An external utilities manager as set forth in claim 63, wherein:

said power corner includes a central aperture shaped to route wires therethrough when connected with said power/data tube, and a removable cap which encloses said central aperture when said power/data tube is not connected with said power corner.

65. An external utilities manager as set forth in claim 64, wherein:

said external utilities manager includes at least one beam support, configured to be attached to said beam and support a free end of said trough.

66. An external utilities manger as set forth in claim 65, including:

at least one fence raceway shaped similar to said vertical raceway, and extending horizontally adjacent a worksurface height.

67. A post and beam furniture system for partitioning open office space, comprising:

at least one overhead beam disposed in a normally horizontal orientation, and having at least one side face thereof disposed in a normally vertical orientation, and an inaccessible interior which prevents routing utilities therethrough;

at least one vertical post having a lower portion thereof adapted to be supported on an associated floor surface, and an upper portion thereof connected with said beam to retain said beam at a predetermined elevation above the floor surface; said post having an X-shaped plan configuration with four outwardly protruding flanges which extend along the length of said post, and an inaccessible interior which prevents routing utilities therethrough;

an external utilities manager for routing utilities externally along said beam and said post, including:

at least one vertical raceway having a hollow interior configured to route utilities therealong, and an enclosed exterior disposed generally between two of said flanges of said post; said vertical raceway extending externally of said post between said flanges along at least a portion of said post to an open upper end thereof; and at least one horizontal raceway positioned adjacent to and extending externally of said beam along said side face thereof, and including an interior configured to route utilities therealong, and at least one end positioned adjacent to and communicating with said upper end of said vertical raceway to externally route utilities throughout said furniture system.

68. A furniture system as set forth in claim 67, wherein:
said vertical raceway has an oval plan configuration.

69. A furniture system as set forth in claim 67, wherein:
said horizontal raceway comprises a tray-shaped trough with an open top for laying utilities into said trough.

70. A furniture system as set forth in claim 67, wherein:
said vertical raceway includes at least one removable cover to access the utilities.

71. A furniture system as set forth in claim 67, wherein:
said exterior of said vertical raceway is perforated to provide a see-through appearance.

72. A furniture system as set forth in claim 67, wherein:
said vertical raceway includes at least one tube bracket mounted to said post, and configured to engage and support cover halves thereon.

73. A furniture system as set forth in claim 67, wherein:
said horizontal raceway includes at least one trough bracket mounted to said beam, and configured to engage and support a trough thereon.

74. A post and beam furniture system for partitioning open office space, comprising:

at least one overhead beam disposed in a normally horizontal orientation, and having at least one side face thereof disposed in a normally vertical orientation, and an inaccessible interior which prevents routing utilities therethrough;

at least one vertical post having a lower portion thereof adapted to be supported on an associated floor surface, and an upper portion thereof connected with said beam to retain said beam at a predetermined elevation above the floor surface; said post including at least two outwardly protruding flanges which extend along the length of said post, and an inaccessible interior which prevents routing utilities therethrough;

an external utilities manager for routing utilities externally along said beam and said post, including:

at least one vertical raceway having a hollow interior configured to route utilities therealong, and an enclosed exterior disposed generally between said flanges of said post; said vertical raceway extending externally of said post between said flanges along at least a portion of said post to an open upper end thereof;

at least one horizontal raceway positioned adjacent to and extending externally of said beam along said side face thereof, and including an interior configured to route utilities therealong, and at least one end positioned adjacent to and communicating with said upper end of said vertical raceway to externally route utilities throughout said furniture system; and wherein said vertical raceway has an oval plan configuration; and said horizontal raceway comprises a tray-shaped trough with an open top for laying utilities into said trough.

75. A furniture system as set forth in claim 74, wherein:
said vertical raceway includes at least one removable cover to access the utilities.

76. A furniture system as set forth in claim 74, wherein:
said exterior of said vertical raceway is perforated to provide a see-through appearance.

77. A furniture system as set forth in claim 74, wherein:
said vertical raceway includes at least one tube bracket mounted to said post, and configured to engage and support cover halves thereon.

78. A furniture system as set forth in claim 74, wherein:
said horizontal raceway includes at least one trough bracket mounted to said beam, and configured to engage and support a trough thereon.

* * * * *